United States Patent [19]

Nagaoka et al.

[11] Patent Number: 4,579,450

[45] Date of Patent: Apr. 1, 1986

[54] DISTANCE DETECTOR DEVICE

[75] Inventors: Shinji Nagaoka; Koji Sato, both of Yotsukaido, Japan

[73] Assignee: Seiko Koki Kabsuhiki Kaisha, Chiba, Japan

[21] Appl. No.: 451,265

[22] Filed: Dec. 20, 1982

[30] Foreign Application Priority Data

Dec. 21, 1981 [JP] Japan .................................. 56-206516

[51] Int. Cl.⁴ ............................. G01C 3/08; G03B 7/00
[52] U.S. Cl. ......................................... 356/4; 354/403
[58] Field of Search ........................ 356/1, 4; 354/403

[56] References Cited

U.S. PATENT DOCUMENTS 4,304,487 12/1981 Odone et al. ............................ 356/1
4,436,418 3/1984 Morino ..................................... 356/1

Primary Examiner—S. C. Buczinski
Assistant Examiner—Gregory C. Issing
Attorney, Agent, or Firm—Robert E. Burns; Emmanuel J. Lobato; Bruce L. Adams

[57] ABSTRACT

Light projected from an active lighting means to an object is reflected by the object, and a light spot is produced on a light-sensitive element by the light reflected from the object. The distance to the object is determined by detecting the position of the light spot on the light-sensitive element.

The light-sensitive element for receiving the reflected light from the object has formed on a portion of a surface thereof an insensitive zone which has the same width or the same area as the light image produced by the reflected light and the light-sensitive element moves on an image plane in a certain relationship with the distance to the object whereby a change in a photoelectric output of the light-sensitive element is detected to detect the distance to the object.

7 Claims, 5 Drawing Figures

DISTANCE DETECTOR DEVICE

BACKGROUND OF THE INVENTION

This invention relates to a distance detector device of the active lighting type which makes use of the principle of triangulation wherein a change in a photoelectric output of a light-sensitive element is detected to measure the distance to an object.

Various devices have heretofore been proposed for use as an automatic distance measuring device for a small camera or the like, that is, as a distance detector device for an automatic focusing camera, which project light by means of an active lighting means therein and receive and convert light reflected from an object into an electric signal which is suitably processed to detect the distance to the object. An example of such devices is disclosed in Japanese laid-open Pat. No. 55-89703 which discloses a device having a plurality of light-sensitive elements each corresponding to different object distances whereby that one of the light-sensitive elements which receives best the reflected light from the object is detected in order to measure the distance to the object. Another distance detector device is disclosed in U.S. Pat. No. 4,436,418 which is commonly owned with the present application and which discloses a device having a shade detector which moves over a surface of a single light-sensitive element to effect an intended distance measurement.

The present invention improvements relates to in the aforedescribed distance detector devices and the provision of a distance detector device which can be manufactured at a reduced cost.

SUMMARY OF THE INVENTION

According to the present invention, a distance detector device is constituted such that it projects light toward an object and receives light reflected from the object by means of a single conventional light-sensitive element such as, for example, a silicon photodiode. Furthermore, the light-sensitive element has formed on a portion of a surface thereof an insensitive zone which has substantially the same width or area as the light image formed by the reflected light, and it moves on an image plane in a certain relationship with the distance to the object whereby a change of a photoelectric output of the light-sensitive element is detected thereby to detect the distance to the object. Accordingly, the distance detector device of the present invention eliminates the necessity of using a plurality of light-sensitive elements and thus simplifies the circuit construction thereof very much. The distance detector device also eliminates the necessity of a shade detector adapted to move on a surface of the light-sensitive element, and can present a change of a photoelectric output which is similar to that obtained when such a shade detector is moved, the distance being measured or determined by detecting such a change of the photoelectric output. A detecting circuit for use with the distance detector device of the present invention may be a circuit quite similar to a detecting circuit included in the distance detector device which has been already proposed in the aforesaid U.S. Pat. No. 4,436,418, that is, such a circuit that can present a distinguished lowest point of the output voltage or current, that is, a negative peak point.

DETAILED DESCRIPTION OF THE INVENTION

Figure 1:
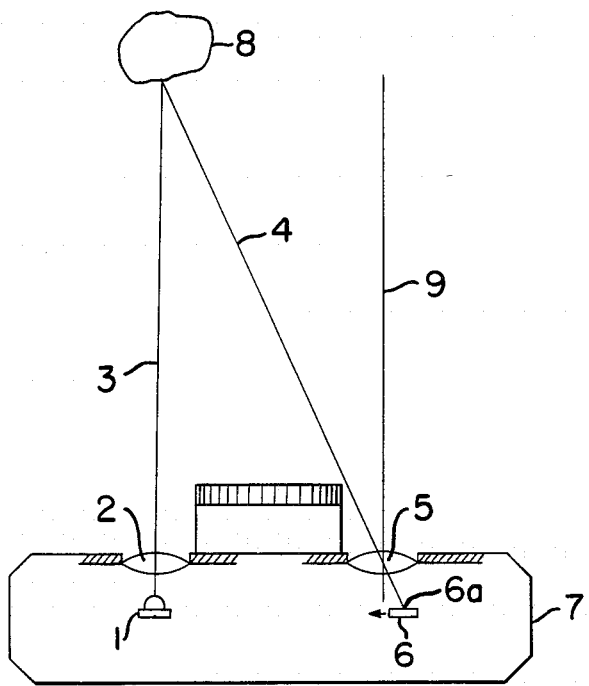
FIG. 1 is a diagrammatic representation of an exemplary distance detector device of the present invention which is applied to a still camera.

An embodiment of the present invention will be described with reference to the accompanying drawings.

In the drawings, reference numeral 1 designates a light emitting element such as, for example, a lamp or an LED, 2 a light projecting lens for concentrating light emitted from the element 1 into the form of a beam, 3 an optical axis of the light projected from the lens 2, 4 an optical axis of the reflected light, 5 a light receiving lens, 6 a light-sensitive element, 6a a light spot produced on the light-sensitive element 6 by the reflected light along the optical axis 4, 7 a camera body, 8 an object, and 9 an optical axis of the light receiving lens 5. Furthermore, reference numerals 10, 11 each designate an operational amplifier, 12, 13 each a feedback resistor, 14 designates a coupling capacitor, 16 a detecting diode, 17 an integrating capacitor, 15, 18 and 19 each designate a resistor, 20 designates a light emitting element driving circuit, and Vo an output voltage.

Operations of the distance detector device of the present invention will now be described in detail.

According to the distance detector device of the present invention, the light-sensitive element 6 is disposed on an image plane of the light receiving lens 5 as shown in FIG. 1 and is movable perpendicularly to the optical axis 9. The light-sensitive element 6 has on a surface thereof an insensitive zone of such a structure as hereinafter described.

Referring to FIG. 1, light from the light emitting element 1 is concentrated into the form of a beam by the light projecting lens 2 and is projected along optical axis 3 to the object 8. The light reflected from a surface of the object 8 is reflected along the optical axis 4 and is centered by the light receiving lens 5 to produce the light spot 6a which impinges on the light-sensitive element 6. A different image forming means may be employed instead of the light receiving lens 5. The position of the light spot 6a produced on the light-sensitive element 6 varies in accordance with the distance to the object 8. If the object is located at an infinitely spaced remote place, the reflected light will be projected in at an angle which is coincident with the optical axis 9 of the light receiving lens 5 and a light spot will be produced at a point of the light-sensitive element 6 at which it is intersected by the optical axis 9 of the light receiving lens 5. As the object becomes closer, the position at which the light spot is produced is gradually displaced rightwardly on the light-sensitive element 6 in FIG. 1. Accordingly, the distance to the object can be determined by detecting a change of a photoelectric output signal of the light-sensitive element having such an insensitive zone as described hereinbefore to detect the position of the light spot on the light-sensitive element 6. An example of a detecting circuit therefor is illustrated in FIG. 3.

Figure 3:
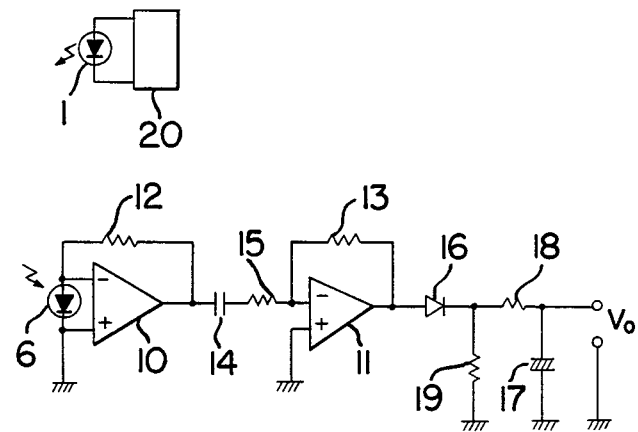
FIG. 3 is a schematic view of a detecting circuit for use with the distance detector device of the present invention.

Referring now to FIG. 3, both output terminals of the light-sensitive element 6 are connected to positive and negative inputs of the operational amplifier 10, respectively, so that the short current of the light-sensitive element 6 is amplified by the operational amplifier 10 and is delivered by way of the coupling capacitor 14 to the amplifier 11 at the next stage at which it is further AC amplified. The output of the amplifier 11 is detected by the diode 16 and is then integrated at the capacitor 17 which provides an output of a voltage Vo. It is to be noted that, in this embodiment, the light emitting element 1 is driven under pulse modulation of a predetermined frequency. In practice, the adverse influence of natural light, that is, what is called external light, can be eliminated almost completely if modulated light is thus used for the incident light to the distance detector device.

Figure 2:
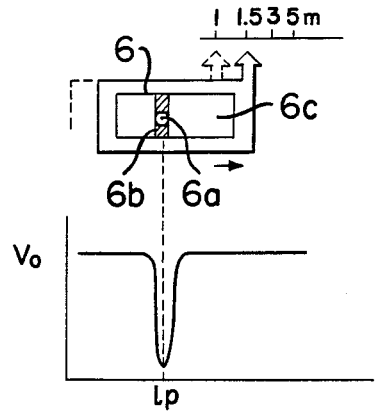
FIG. 2 is a diagrammatic representation illustrating operations of the distance detector device of the present invention.

When the light-sensitive element 6 is at a position as shown in FIG. 2, the light spot or image 6a produced by the reflected light from the object 8 coincides with the insensitive zone 6b of the light-sensitive element 6 so that the output Vo from the aforedescribed detecting circuit is reduced to a minimum. Adjacent this point on either side thereof, an image of the light spot 6b is formed on a portion of the light-sensitive element 6 which has a photoelectric transducing capacity, and hence an output can be obtained from the light-sensitive element 6. As a result, a negative peak signal appears when the light-sensitive element 6 moves in a direction corresponding to a movement from a near place to a remote place (i.e., from the left to the right in FIG. 2). This principle also applies to a movement in the opposite direction.

The light-sensitive element 6 receives, in addition to the reflected light 4, natural light, but a significant output voltage cannot be obtained therefrom since the detecting circuit is designed to have such an AC amplifying characteristic than an output current caused by natural light is hardly detected.

Consequently, the output voltage VO can be obtained only when the AC modulated reflected light from the object 8 is projected into the distance detector device. In this way, the distance to the object can be determined by detecting a point 1p when a negative peak of the output voltage Vo is obtained and the detection of the negative peak corresponds to the distance to the object. This distance is 1.5 m in the illustrated embodiment. The distance detector device of the present invention can be incorporated in an automatic focusing camera by constituting the same such that the negative peak position as described above is electrically detected by means of a known peak detecting circuit and the position of the objective lens of the camera is automatically adjusted.

Figure 4A:
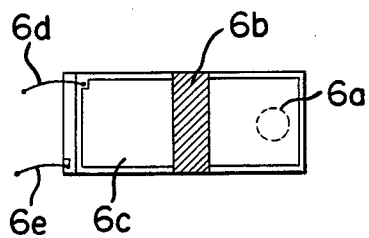
FIGS. 4a and 4b diagrammatic representations of exemplary light-sensitive elements for use with a distance detector device of the present invention.
Figure 4B:
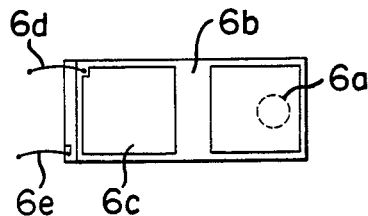

FIG. 4 illustrates examples of the structure of the light-sensitive element which has an insensitive zone as described above. In this figure, reference numeral 6a designates a light spot, 6b an insensitive zone, 6c a photoelectrically transduceable zone, and reference numerals 6d, 6e each designate an electrode. FIG. 4(a) illustrates a structure which has an insensitive zone comprised of a light-blocking material formed thereon by pasting a thin shade detecting film or the like to a light-sensitive semiconductor chip such as a silicon photodiode. FIG. 4(b) shows another structure which has an insensitive zone which comprises a light-blocking material made by forming an electrode at a central portion thereof.

The insensitive zone 6b of the light-sensitive element presents a most efficient output waveform when the size of the light spot 6a coincides with the width of the insensitive zone 6b. It is to be noted that structures and configurations of an insensitive zone are not limited to those of the embodiments as disclosed herein. For example, an insensitive zone can be formed by using a technique of evaporation or application to a surface of the light-sensitive element.

As apparent from the foregoing description, according to the present invention, a distance detector device of the type which projects light therefrom and receives reflected light to detect a distance to an object comprises a single light-sensitive element which is not required to have a special performance and thus may be an element such as a conventional photodiode. Accordingly, the construction of circuitry therefor can be extremely simplified, and hence the distance detector device can be provided at a reduced cost. Furthermore, the distance detector device includes no movable scanning mirror, which eliminates the necessity of difficult adjustment, and it can be used not only in a still camera but also as a distance detector device for a wide variety of applications.

We claim:

1. A distance detecting device of the type which has an active lighting means including a light emitting element and a light projecting lens for projecting light to an object and wherein light reflected from the object is received to measure a distance to the object, the device comprising: an image forming means for receiving the light reflected from the object and forming a light image thereof on an image plane, a light-sensitive element disposed for movement on the image plane of said image forming means and having an insensitive zone thereon, and a detecting circuit for detecting a negative peak in a photoelectric output of said light sensitive element which is caused by the reflected light from the object impinging on said insensitive zone during the movement of said light-sensitive element to thereby detect the distance to the object.

2. A distance detecting device according to claim 1, characterized in that said light-sensitive element is a single photovoltaic element having said insensitive zone formed on a surface thereof, said insensitive zone having the same width as that of the light image formed by the reflected light from the object.

3. A distance detecting device for measuring the distance to an object comprising: light-emitting means for emitting light and projecting the light toward an object whose distance is to be measured; light-receiving means for receiving the light reflected from the object and focussing the received light into a light image on an image plane; movable light-sensing means having a light sensitive surface for developing an electrical output signal proportional to light impinging thereon and disposed for movement along the image plane such that the light image is scanned along the light sensitive surface to produce a corresponding electrical output signal, the light sensitive surface having means defining an insensitive zone effective to produce a negative peak in the electrical output signal corresponding to the position of the light sensitive surface at which the light image impinges on the insensitive zone; and detecting circuit means responsive to the electrical output signal for detecting therefrom the negative peak and producing a corresponding distance signal representative of the distance to the object.

4. A distance detecting device according to claim 3; wherein the means defining an insensitive zone comprises a light-blocking material disposed over the light sensitive surface.

5. A distance detecting device according to claim 4; wherein the light-blocking material comprises a film adhered to the light sensitive surface.

6. A distance detecting device according to claim 4; wherein the insensitive zone has a width dimension, as viewed in the direction of movement of the light sensitive surface, which is the same as that of the light image.

7. A distance detecting device according to claim 3; wherein the insensitive zone has a width dimension, as viewed in the direction of movement of the light sensitive surface, which is the same as that of the light image.

* * * * *